United States Patent [19]

Meger et al.

[11] Patent Number: 5,708,964

[45] Date of Patent: Jan. 13, 1998

[54] PAGING SATELITE LINE RECEIVER HAVING AUTOMATIC SIGNAL ACQUISITION

[75] Inventors: Eric A. Meger, Charlotte, N.C.; Riley S. Hoyt, Fort Langley, United Kingdom

[73] Assignee: Glenayre Electronics, Inc., Charlotte, N.C.

[21] Appl. No.: 513,546

[22] Filed: Aug. 10, 1995

[51] Int. Cl.$^6$ ..................................... H04B 7/185
[52] U.S. Cl. .................. 455/12.1; 455/161.2; 455/458; 455/184.1
[58] Field of Search .................. 455/161.1, 161.2, 455/161.3, 184.1, 164.1, 164.2, 12.1, 23.1, 13.2, 33.1, 34.2, 51.2, 54.1, 56.1, 227, 226.1, 229, 226.2, 67.1, 67.3, 38.1, 38.2, 458, 426, 427, 31.3; 340/825.44, 825.21

[56] References Cited

U.S. PATENT DOCUMENTS

| | | |
|---|---|---|
| 4,551,855 | 11/1985 | Kurosaki et al. ............... 455/161.1 |
| 4,965,851 | 10/1990 | Tejima ............................ 455/184.1 |
| 5,008,952 | 4/1991 | Davis et al. . |
| 5,010,317 | 4/1991 | Schwendeman et al. . |
| 5,047,763 | 9/1991 | Kuznicki et al. . |
| 5,121,503 | 6/1992 | Davis . |
| 5,122,795 | 6/1992 | Cubley et al. . |
| 5,129,095 | 7/1992 | Davis et al. . |
| 5,197,084 | 3/1993 | Fuhrman ....................... 455/161.2 |
| 5,239,668 | 8/1993 | Davis . |
| 5,239,670 | 8/1993 | Schwendeman et al. . |
| 5,239,671 | 8/1993 | Linquist et al. . |
| 5,257,019 | 10/1993 | Schwendeman et al. . |
| 5,260,700 | 11/1993 | Merchant et al. . |
| 5,301,354 | 4/1994 | Schwendeman et al. . |

*Primary Examiner*—Nguyen T. Vo
*Attorney, Agent, or Firm*—Christensen O'Connor Johnson & Kindness PLLC

[57] ABSTRACT

A satellite receiver includes a signal acquisition unit that is operative to receive a validation signal from a station controller located at a paging station. The satellite receiver is operative to lock onto a satellite signal. When the satellite receiver locks onto a satellite signal, the satellite receiver demodulates the satellite signal into a digital data stream that is forwarded to the station controller for packaging and retransmission as a page. The station controller includes circuitry to determine if the digital data stream is correct and intended for the station controller. If the digital data stream is correct, the station controller generates a validation signal and forwards the validation signal to the signal acquisition unit of the satellite receiver. If the digital data stream is incorrect, the station controller will forward a negative validation signal to the signal acquisition unit. In response to the negative validation signal, the signal acquisition unit will cause the satellite receiver to continue scanning the predetermined frequency range for other satellite signals.

9 Claims, 3 Drawing Sheets

PAGING SATELLITE LINE RECEIVER HAVING AUTOMATIC SIGNAL ACQUISITION

FIELD OF THE INVENTION

The present invention relates generally to satellite receivers and, more particularly, to an improved satellite receiver suitable for receiving paging data from a satellite and suitable for automatically locking onto a correct satellite carrier frequency.

BACKGROUND OF THE INVENTION

Simulcasting is the practice of broadcasting a single radio-frequency signal from multiple locations at the same time. Simulcast transmission networks are established when it is desirable to maximize the area over which receivers tuned to the network's broadcast frequency are able to pick up and process the broadcast signal. A paging system is one type of radio system that is operated as a simulcast system. In a paging system, system subscribers are provided with small radio receivers, called pagers. The paging system further includes one or more paging terminals and a number of transmitter sites. The paging terminals are connected to the publicly switched telephone network and receive calls for the individual system subscribers. In response to receiving an incoming call, a paging terminal will generate a message, also referred to as a page. The page is forwarded to the transmitter sites, which broadcast the page for receipt by the subscriber's pager. When a page is received by a pager for the subscriber to whom the pager is assigned, an annunciator or display integral with the pager is actuated to inform the subscriber of the call. Paging systems are provided with multiple, spaced-apart transmitter sites to maximize the coverage area in which a pager can function. The transmitter sites are also referred to as paging stations.

Many simulcast systems have some type of link network between the central station, from which the signal to be broadcast originates, and the individual transmitter sites from which the signal is finally broadcast. Although not always the case, the central station is typically located physically near or at the paging terminal. A link network may take the form of a telephone or fiber-optic signal link between the central station and one or more particular transmitter sites. A link may alteratively take the form of a radio link between the central station and the transmitter site over a carrier frequency different from that over which the transmitter sites actually broadcast the simulcast signals. The links to some transmitter sites may actually be a multi-link connection. For example, it is not uncommon for a central station to first forward the signal to be simulcast to a satellite transmitter. The signal is sent up to a satellite, which retransmits it to one or more transmitter sites.

In the case of the link being a microwave, satellite, or other "over-the-air" transmission methods, each of the transmitter sites include a link receiver. The link receiver is tuned to the particular frequency the link data is being sent and is operative, once the receiver has locked onto the correct link frequency, to demodulate the link signal and output the raw paging data to the transmitter. One difficulty, particularly for satellite links, is the ability for the receivers to lock onto the link signal effectively. In the case satellite transmission, due to various instabilities in the hardware, the signal from the satellite to the ground receivers may vary from the expected pre-programmed frequency. In this case where the satellite receiver is tuned to the wrong frequency, the receiver will not receive a signal which can be demodulated into a data stream.

To address this difficulty, many prior art satellite receivers include sophisticated electronic circuitry that sequentially tunes a range of frequencies centered on the expected frequency to search for a usable satellite carrier signal. If the satellite carrier signal uses a broad band of frequencies (i.e. the bandwidth) or, equivalently, if the nearest adjacent carrier signals have a large offset from the desired carrier relative to the instabilities in the hardware used in the transmission and reception system, then there can be a high degree of confidence that a signal that is found by such a receiver is in fact the desired signal.

However, it is sometimes the case that the bandwidth or channel spacing is small relative to the instabilities of the system. For example, this can occur when a low data rate signal is sent on a busy satellite transponder and when a low cost low noise block-downconverter (LB) is used at the satellite receiver.

SUMMARY OF THE INVENTION

The present invention provides a low cost satellite receiver that can automatically lack onto the correct satellite carrier frequency. The satellite receiver includes a signal acquisition unit that is operative to receive a validation signal from a station controller located at a paging station. In operation, when the satellite receiver locks onto a satellite signal within a predetermined frequency range, the satellite receiver demodulates the satellite signal into a digital data stream. The digital data stream is forwarded to the station controller for retransmission as a page. The station controller includes circuitry to determine if the digital data stream is correct and intended for the station controller. If the digital data stream is correct, the station controller generates a validation signal and forwards the validation signal to the signal acquisition unit of the satellite receiver. Upon receipt of the validation signal, the signal acquisition unit causes the satellite receiver to remain locked onto the satellite signal.

In contrast, if the satellite signal originally acquired by the satellite receiver is incorrect and not intended for the paging station, then the digital data stream sent to the station controller will be determined by the station controller as being incorrect. In such a case, the station controller will forward a negative validation signal to the signal acquisition unit. In response to the negative validation signal, the signal acquisition unit will cause the satellite receiver to continue scanning the predetermined frequency range for other satellite signals. In this manner, the satellite receiver working in conjunction with the station controller will be able to lack onto the correct satellite signal.

BRIEF DESCRIPTION OF THE DRAWINGS

The foregoing aspects and many of the attendant advantages of this invention will became more readily appreciated as the same becomes better understood by reference to the following detailed description, when taken in conjunction with the accompanying drawings, wherein.

DETAILED DESCRIPTION OF THE PREFERRED EMBODIMENT

The following are definitions of frequently appearing terms and acronyms that appear in the Detailed Description.

Terms that have a subscript suffix "$_x$" are those wherein the system of this invention has multiple numbers of those units, which are distinguished from each other in the Detailed Description.

System Controller The central unit of the system that receives paging signals from a paging terminal and that forwards the paging signals to the paging stations for broadcast by the paging stations.

Link channel$_x$ A communications network over which PDBs are transmitted from the system controller to one or more paging stations.

Paging terminal A unit that generates paging signals for simulcast by the system of this invention.

PDB Paging Data Block. The basic signal packet in which paging signals and the control information for regulating the broadcast of same are broadcast from the system controller to the paging stations.

Paging Station A transmitter site distal from the hub from which signals are broadcast. Signals are broadcast from a number of paging stations simultaneously.

Station packet A packet of data that is sent to the stations from the system controller central processing unit through a link channel. A station packet may contain a paging data block or material, such as operating instructions, that the paging station should act upon.

Figure 1:
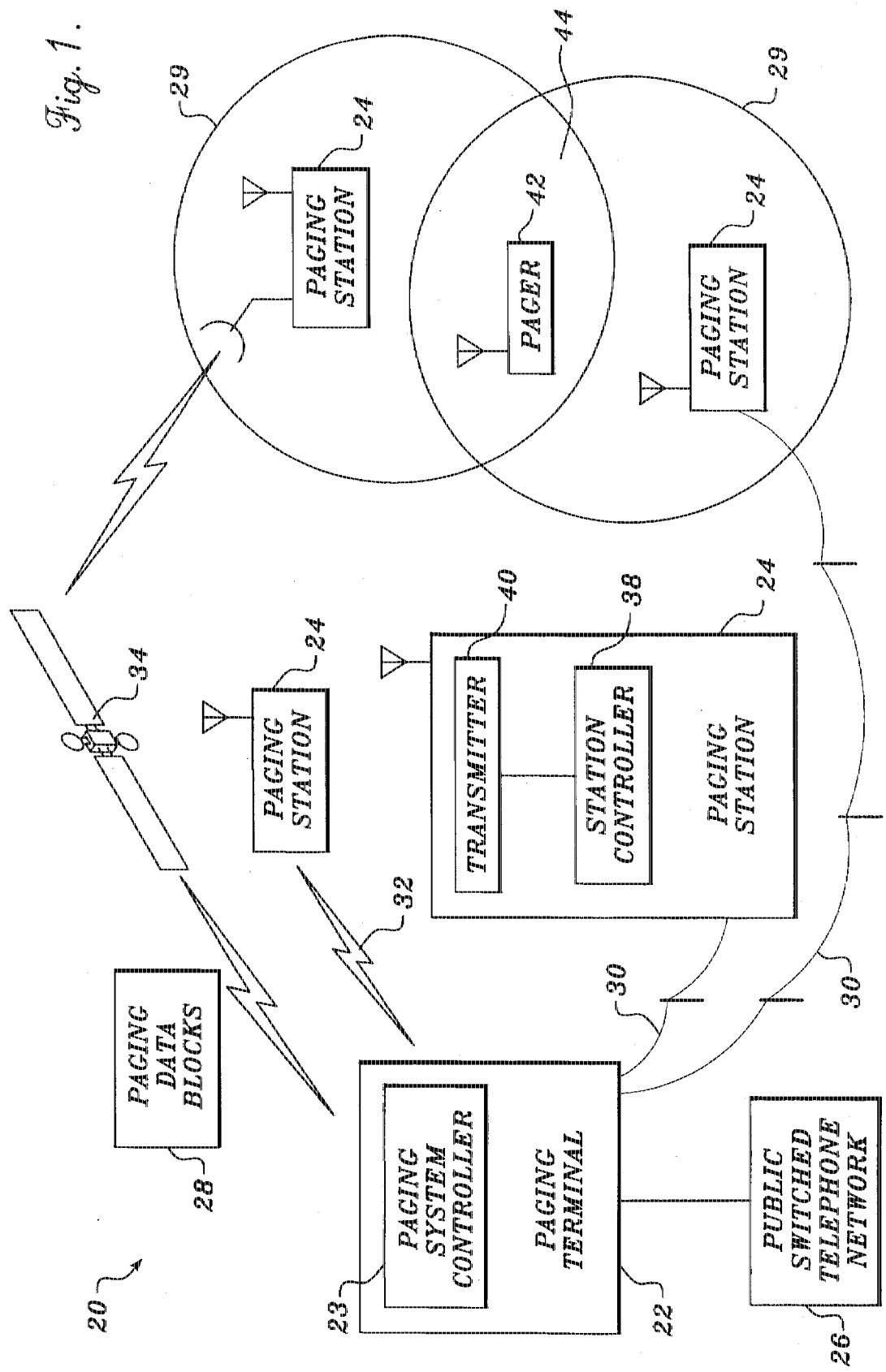
FIG. 1 is a schematic diagram of a typical paging system.

FIG. 1 illustrates a paging system 20 incorporating the method and apparatus of the present invention. Paging system 20 includes a paging terminal 22, a paging system controller 23, and a number of base stations 24 that are spread over a wide geographic area. The paging system controller 23 is integral with the paging terminal 22, as shown in FIG. 1. The paging terminal 22 is connected to a public switched telephone network (PSTN) 26 for receiving incoming telephone calls that comprise requests to page individuals who subscribe to the paging system 20. In response to the incoming calls, the paging terminal 22 creates pages that are transmitted by the paging terminal 22 to the paging system controller 23. The paging system controller 23 bundles the pages into paging data blocks (PDBs) 28 that are forwarded to the paging stations 24. The PDBs contain different categories of information, including the actual paging data, forward error correction information, addressing information, and timing information. The paging stations 24, in turn, each broadcast the pages over a specific geographic area, as represented by circles 29 for the exemplary paging stations that are shown in FIG. 1.

The actual method by which PDBs 28 are forwarded to the paging stations 24 depends on such factors as the hardware of the paging stations, the distance to the paging stations, and/or the economics of employing specific forwarding systems. For example, PDBs 28 can be forwarded over a hard wire or fiber-optic telephone link 30. Other paging stations 24 are configured to receive the PDBs 28 over a microwave link 32, while still others receive them over a satellite link 34. In the case of the PDBs being transmitted via satellite 34, the receiving paging station includes a satellite receiver 35. Paging stations 24 may, of course, receive PDBs 28 over two or more alternative communication links. In the event one link fails, the others could be employed to ensure that the PDBs 28 are received.

Alternatively, the multiple links can be employed to simultaneously send multiple copies of each PDB 28 to the paging stations 24 to allow processing equipment at the individual stations to use the information from each of the PDBs to correct for any transmission errors. The links 30, 32, and 34 that are used to transmit the PDBs from the paging system controller 23 to each of the paging stations 24 in the system are collectively referred to as the link system or link network.

Each paging station 24, one of which is shown in detail at the center of FIG. 1, contains a station controller 38 and a transmitter 40. The station controller 38 receives the PDBs 28 from the paging system controller 23 and converts the paging information contained therein into a format so that it can be modulated for broadcast by the transmitter 40.

The individual station controllers 38 control the transmission of the pages so that all the transmitters 40 broadcast the same page at exactly the same instant. This simulcasting ensures that when a pager receiver 42 is in an area where broadcasts from two or more paging terminals can be received, as represented by the overlapping area 44 between circles 29, the pager receiver receives a signal that can be readily processed. Thus, the station controllers 38 control the transmission of the pages contained in the PDBs 28 by the individual transmitters 40 so as to cause each transmitter to broadcast the pages contained within a single, common, PDB 28 at the same time.

The present invention is primarily directed towards a satellite receiver for receiving data transmitted over a satellite link channel. Typically, when the paging terminal via the system controller transmits a PDB or other data over a satellite link channel, a single channel per carrier (SCPC) transmission system is employed. A SCPC transmission system relays multiple signals (or channels) over a single satellite transponder. In a SCPC transmission system, a separate RF carrier is used for each channel (as opposed to multiplexing multiple channels onto a single RF carrier). Multiple carriers can be transmitted (relayed) over a single satellite transponder by assigning each carrier its own unique portion of the tranponder's RF spectrum. The PDB is modulated onto a carrier frequency, for example at 14 GHz. The signal from the paging terminal to the satellite 34 is referred to as the uplink signal. The satellite 34 receives the uplink signal, amplifies the uplink signal, and retransmits the PDB back to the paging stations 24 located on Earth on a new frequency, for example typically between 11.7–12.2 GHz. The signal from the satellite 34 to the paging stations 24 is referred to as the downlink signal.

Figure 2:
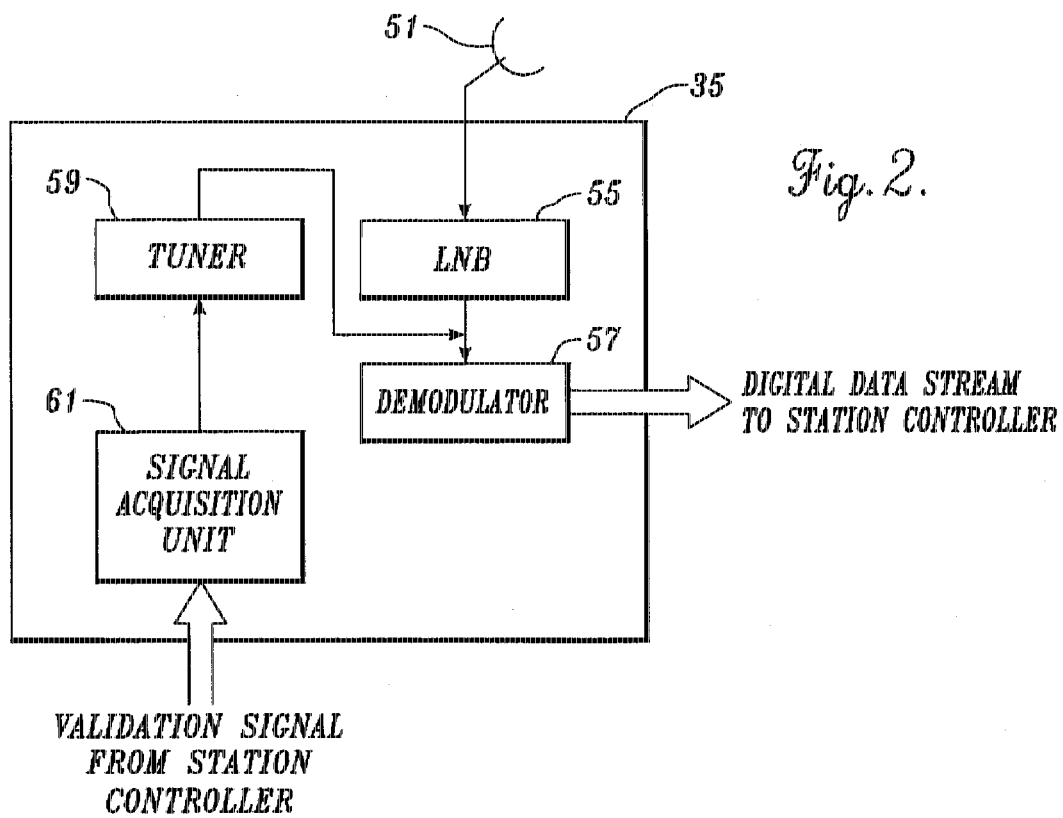
FIG. 2 is a schematic diagram of the preferred embodiment of a satellite receiver formed in accordance with the present invention.

At the paging stations, the downlink signal is received via the satellite receiver downlink system 35. Turning to FIG. 2, satellite receiver 35 includes a high gain antenna 51, a low noise block downconverter 53 (LB), a demodulator 57, a tuner 59, and a signal acquisition unit 61. In nominal operation, the downlink signal is received by antenna 51. The downlink signal is amplified by LNB 55. LNB 55 is operative to amplify and convert the downlink signal into a lower frequency modulated analog signal. The signal output from LNB 55 is then provided to demodulator 57 which demodulates the output signal of LNB 55 and provides a digital data stream. The digital data stream is output by satellite receiver 35 and provided to the station controller 38 of the paging station 24 for simulcast.

The operation of elements 51–57 is known in the art and one such satellite receiver that includes these components is the DR86 Receiver manufactured and sold by Wegener Communications, Inc. of Duluth, Ga. However, the DK86 Receiver and other prior art satellite receivers include additional circuitry that receive the digital data stream from their demodulators and analyze the data stream to determine whether or not the data stream is correct, and thus, the satellite receiver has acquired the correct signal. The additional circuitry can add significantly to the cost of each satellite receiver.

In contrast, the present invention does not include such relatively complex circuitry and instead relies upon a signal acquisition unit 61 that is operative to receive a validation signal from the station controller 38. The station controller 38, being specifically designed for receiving a data stream including PDB's, can quickly determine whether or not the data stream being output by satellite receiver 35 is a desired signal and valid.

In particular, the station controller 38 examines the data stream for a specific link identification code (or link ID) embedded in the data stream. The link ID is defined by the system controller 23 where the PDBs are being transmitted. Each paging channel on the satellite 34 uses a unique link ID to avoid locking onto an incorrect carrier.

Figure 3:
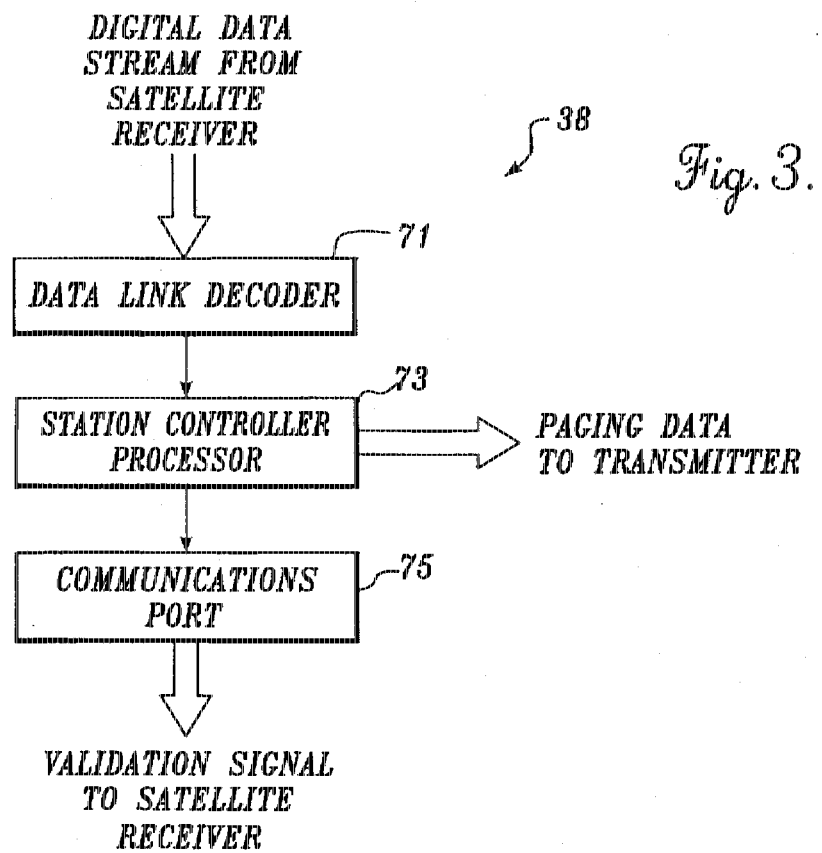
FIG. 3 is a schematic diagram of a station controller.

Turning to FIG. 3, the station controller includes a data link decoder 71, a station controller processor 73 and communications port 75. In normal operation, the digital data stream from the satellite receiver 35 is provided to the data link decoder 71 which monitors for the correct link ID. The station controller 38 uses data link decoder 71 to constantly monitor the data stream carried by the downlink for a specified correct link ID. The data link decoder 71 informs the station controller processor 73 of the link D status. The station controller processor 73 sends validation signals to the signal acquisition unit 61 using the communications port 75.

In operation, when the satellite receiver 35 detects a candidate signal that is possibly the correct downlink signal, the receiver 35 demodulates the candidate signal and forwards the digital data stream to the station processor 38. The satellite receiver 35 also enters a "Waiting-For-Validation" state. This state change is signaled to the station controller 38 through the communications port 75. The receiver 35 then waits for a positive or negative validation signal from the station controller 38.

At the station controller 38, if the candidate signal (in the form of the digital data stream) is found to contain the correct link ID indicative of a correct downlink signal, then the station controller 38 will issue a positive validation signal to the satellite receiver 35 through communications port 75. The satellite receiver 35 then enters the "Locked-And-Verified" state. If an invalid candidate signal is detected, then the station controller 38 issues a negative validation signal over the communications port 75 and the satellite receiver 35 enters a "Signal-Acquisition" state resumes scanning the satellite transponder 34 over a predetermined frequency range. Communications port 75 is used to send and receive validation signals and status/state information between the satellite receiver 35 and the station controller 38. It can be appreciated that the link ID is one means of determining whether the digital data stream is correct. Other indicia era correct digital data stream may also be used, such as analyzing the frame synchronization pattern, or other embedded pattern unique to paging data blocks being transmitted.

Furthermore, in an alterative embodiment, the station controller will issue a positive validation signal (or merely a validation signal) if the digital data stream is valid. If the digital data stream is invalid, then the station controller 38 does not issue any validation signal, or any signal whatsoever. The satellite receiver 35 will be operative to lock onto the current satellite signal only in the event of receipt of a validation signal. If no validation signal is received, then the satellite receiver 35 will continue scanning the predetermined frequency range.

Much of the station controller 38 is known in the prior art, and in particular, one suitable station controller 38 is the GLC2000 Transmitter Controller manufactured by Glenayre Electronics, Inc., Vancouver, B.C., CANADA. However, in the present invention, the station controller 38 is modified to provide the validation signal when the digital data stream is determined to be the desired signal. If the station controller determines that the digital data stream is correct, then the station controller 38 transmits to the satellite receiver a validation signal. In the preferred embodiment, the digital data stream is always provided to the station controller 38 for analysis.

In turn, when the satellite receiver 35 receives a positive validation signal fore the station controller 38, it is routed to the signal acquisition unit 61. The signal acquisition unit 61, upon receiving a positive validation signal directs the tuner 59 and demodulator 57 to lock onto the current frequency. The satellite receiver 35 remains locked onto that particular frequency and signal until such point the station controller 38 no longer provides a positive validation signal.

For example, if the satellite receiver 35 is locked onto the incorrect signal and frequency, then the digital data stream provided to station controller 38 likely would be unrecognizable to the station controller 38. In that instance, station controller would provide a negative validation signal (or no validation signal at all) to the signal acquisition unit 61. In response to a negative validation signal, the signal acquisition unit 61 directs tuner 59 and demodulator 57 to scan other frequencies within a predetermined frequency range for the correct signal and frequency.

Figure 4:
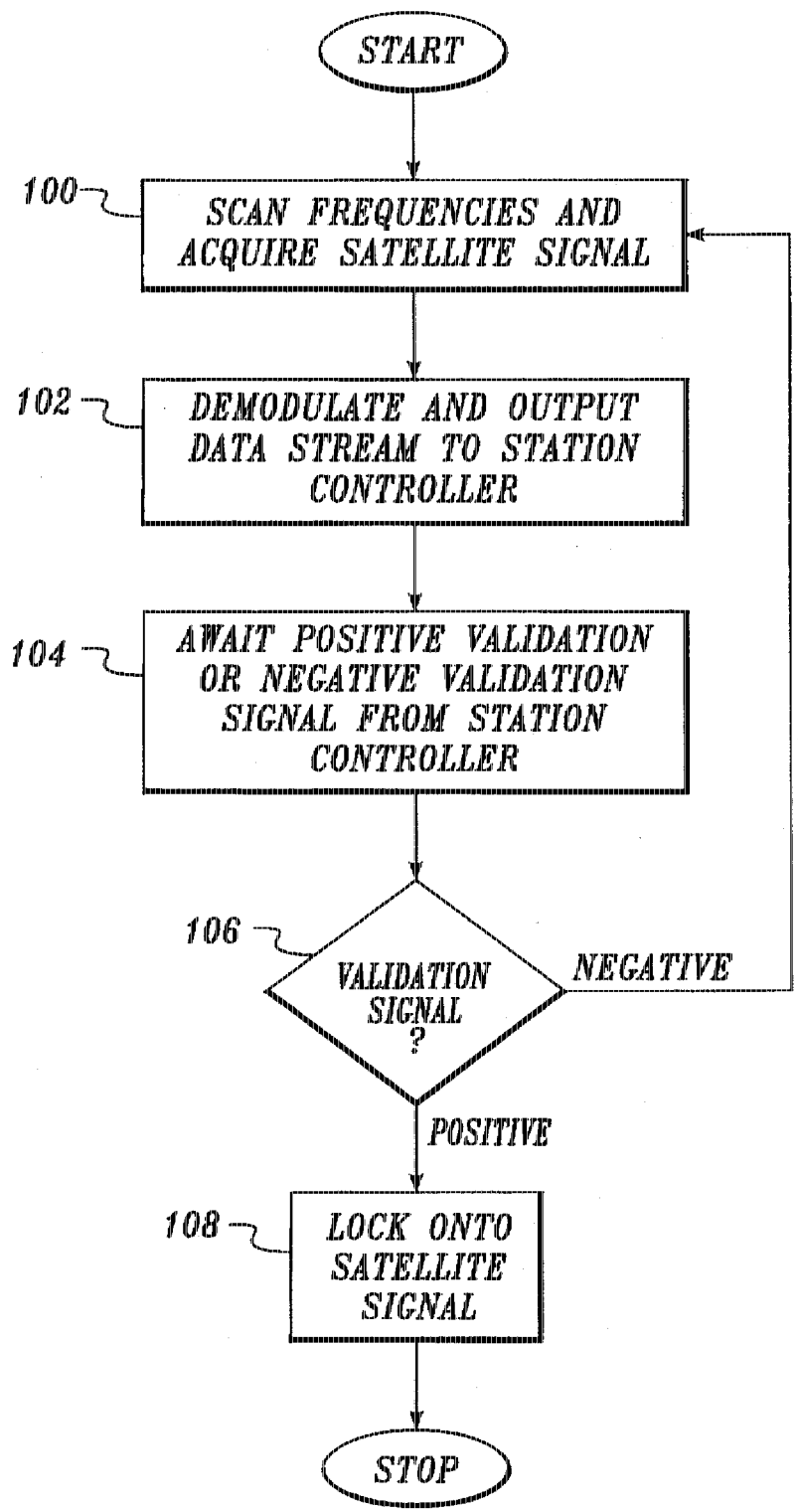
FIG. 4 is a flow chart illustrating the method of the present invention of locking onto a correct satellite signal.

The operation of the above system can be understood more clearly when viewed in conjunction with FIG. 4. Initially, at a box 100, the satellite receiver 35 begins to scan for satellite signals in its predetermined frequency range. After a satellite signal is found, the satellite signal at box 102 is demodulated and a digital data stream is provided to the station controller 38. Next, at box 104, the signal acquisition unit 61 of the satellite receiver 35 awaits from the station controller is either a positive validation signal or a negative validation signal. At box 106, if a positive validation signal is received, then the signal acquisition unit 61 causes the satellite receiver 35 at box 108 to lock onto the satellite signal as the correct signal. If, however, a negative validation signal is received, then the signal acquisition unit 61 causes the satellite receiver to continue scanning for satellite signals in the predetermined frequency range at box 100.

While the preferred embodiment of the invention has been illustrated and described, it will be appreciated that various changes can be made therein without departing from the spirit and scope of the invention. For example, although the satellite receiver has been described in conjunction with a simulcast paging system, the satellite receiver can easily be adapted to work in any communications environment The embodiments of the invention in which an exclusive property or privilege is claimed are defined as follows:

1. A satellite receiver for use in a paging system having a plurality of paging stations, said plurality of paging stations each having resident therein a station controller, said satellite receiver associated with one of said paging stations, said satellite receiver comprising:

(a) an antenna for receiving a satellite signal and routing said satellite signal to said station controller of said one of said paging stations, said station controller including circuitry for analyzing said satellite signal and providing a positive validation signal if said satellite signal is valid and providing a negative validation signal if said satellite signal is invalid;

(b) a tuner for tuning to a specified frequency within a predetermined frequency range such that said satellite signal is received; and (c) a signal acquisition unit coupled to said tuner and operative to receive said validation signal from said station controller, said signal acquisition unit operative upon receipt of said positive validation signal to cause said tuner to lock onto said satellite signal, and said signal acquisition unit operative upon receipt of said negative validation signal to cause said tuner to continue scanning said predetermined frequency range for another said satellite signal.

2. The satellite receiver of claim 1 further including a demodulator coupled to said antenna and operative to demodulate said satellite signal into a digital data stream, said demodulator providing said digital data stream to said station controller resident in each of said paging stations, said station controller analyzing said digital data stream and providing said positive validation signal if said digital data stream is valid and providing said negative validation signal if said digital data stream in invalid.

3. A method of locking onto a valid satellite signal transmitted by a satellite to a paging station, said paging station associated with a satellite receiver and including a station controller, said station controller for issuing validation signals, said method comprising the steps of:

(a) scanning a predetermined frequency range for a candidate signal;

(b) locking onto said candidate signal;

(c) providing said candidate signal to said station controller;

(d) awaiting and receiving a positive validation signal or a negative validation signal from said station controller, said validation signal from said station controller indicative of the validity of said candidate signal;

(e) locking onto said candidate signal as said valid satellite signal if said validation signal is positive; and (f) repeating steps (a)–(e) until said validation signal is positive if said validation signal is negative.

4. The method of claim 3, further including the step of demodulating said candidate signal into a digital data stream prior to providing said digital data stream to said station controller.

5. The method of claim 4 further including the step of wherein said station controller provides a positive validation signal if said digital data stream includes a link D that is assigned to said satellite receiver.

6. A satellite receiver for use in a paging system having a plurality of paging stations, said plurality of paging stations each having resident therein a station controller, said satellite receiver associated with one of said paging stations, said satellite receiver comprising:

(a) an antenna for receiving a satellite signal and routing said satellite signal to said station controller of said one of said paging stations, said station controller including circuitry for analyzing said satellite signal and providing a positive validation signal if said satellite signal is valid;

(b) a tuner for tuning to a specified frequency within a predetermined frequency range such that said satellite signal is received; and (c) a signal acquisition unit operative to receive said validation signal from said station controller, said signal acquisition unit operative upon receipt of said validation signal to cause said tuner to lock onto said satellite signal, and said signal acquisition unit operative in the absence of said validation signal to cause said tuner to continue scanning said predetermined frequency range for another said satellite signal.

7. The satellite receiver of claim 6 further including a demodulator coupled to said antenna and operative to demodulate said satellite signal into a digital data stream, said demodulator providing said digital data stream to said station controller resident in each of said paging stations, said station controller analyzing said digital data stream and providing said validation signal only if said digital data stream is valid.

8. A method of locking onto a valid satellite signal transmitted by a satellite to a paging station, said paging station associated with a satellite receiver and including a station controller, said station controller for issuing validation signals, said method comprising the steps of:

(a) scanning a predetermined frequency range for a candidate signal;

(b) locking onto said candidate signal;

(c) providing said candidate signal to said station controller;

(d) awaiting and receiving a positive validation signal from said station controller, said validation signal from said station controller indicative of the validity of said candidate signal;

(e) locking onto said candidate signal as said valid satellite signal if said validation signal is received; and (f) repeating steps (a)–(e) until said validation signal is received.

9. The method of claim 8, further including the step of demodulating said candidate signal into a digital data stream prior to providing said digital data stream to said station controller.

* * * * *